: US 11,231,262 B2

United States Patent
Singh et al.

(10) Patent No.: US 11,231,262 B2
(45) Date of Patent: Jan. 25, 2022

(54) DYNAMICALLY ADAPTING OPERATION OF A COORDINATE MEASURING MACHINE

(71) Applicant: Hexagon Metrology, Inc., North Kingstown, RI (US)

(72) Inventors: Gurpreet Singh, Providence, RI (US); Jürgen Schneider, Wetzlar (DE)

(73) Assignee: Hexagon Metrology, Inc., North Kingstown, RI (US)

( * ) Notice: Subject to any disclaimer, the term of this patent is extended or adjusted under 35 U.S.C. 154(b) by 827 days.

(21) Appl. No.: 15/953,891

(22) Filed: Apr. 16, 2018

(65) Prior Publication Data

US 2019/0316893 A1    Oct. 17, 2019

(51) Int. Cl.
*G01B 21/04* (2006.01)
*G01B 5/008* (2006.01)
*G01B 5/20* (2006.01)
*G05B 19/401* (2006.01)

(52) U.S. Cl.
CPC .............. *G01B 5/008* (2013.01); *G01B 5/20* (2013.01); *G01B 21/04* (2013.01); *G01B 21/045* (2013.01); *G05B 19/401* (2013.01)

(58) Field of Classification Search
CPC .......... G01B 5/008; G01B 5/20; G01B 21/04; G01B 21/045
See application file for complete search history.

(56) References Cited

U.S. PATENT DOCUMENTS

| 5,471,406 | A  | 11/1995 | Breyer et al. |
| 2005/0263727 | A1 | 12/2005 | Noda |
| 2016/0341533 | A1* | 11/2016 | Noda ..................... G01B 5/008 |

FOREIGN PATENT DOCUMENTS

WO    WO-2018/060693    4/2018

OTHER PUBLICATIONS

International Search Report and Written Opinion for International Application No. PCT/US2019/025328 dated Jun. 25, 2019 (11 pages).

* cited by examiner

*Primary Examiner* — Phuc T Dang
(74) *Attorney, Agent, or Firm* — Nutter McClennen & Fish LLP

(57) ABSTRACT

A coordinate measuring machine revises its original measurement trajectory, prior to completing its measurement of a work piece, upon detecting misalignment between its original measurement trajectory and the orientation of the work piece.

20 Claims, 11 Drawing Sheets

DYNAMICALLY ADAPTING OPERATION OF A COORDINATE MEASURING MACHINE

TECHNICAL FIELD

The present invention relates to coordinate measuring machines, and more particularly to operation of coordinate measuring machines.

BACKGROUND ART

Coordinate measuring machines (CMMs) are used for accurately measuring a wide variety of work pieces. For example, CMMs can measure critical dimensions of aircraft engine components, surgical tools, and gun barrels. Precise and accurate measurements help ensure that their underlying systems, such as an aircraft in the case of aircraft components, operate as specified.

In operation, some coordinate measuring machines blindly execute a sequence of moves and measurements, on the assumption that the work piece is in an expected, or specified, orientation relative to the coordinate measuring machine. In the work piece is not in that orientation, however, the moves and measurements may fail to properly measure the work piece, or may even contact the work piece in undesirable, unintended ways, risking damage to the work piece or the coordinate measuring machine itself.

SUMMARY OF THE EMBODIMENTS

In accordance with one embodiment described below, a system for measuring a work piece includes a trajectory module configured to store an established measurement trajectory, and a controller in data communication with the trajectory module to receive, from the trajectory module, the established measurement trajectory. The controller is configured to control a measuring probe to measure the work piece according to a subset of, but less than all of, the established measurement trajectory.

The system also includes a trajectory analysis module configured to analyze an actual trajectory executed by the measuring probe, relative to the established measurement trajectory, based on measurements of the work piece taken according to at least two consecutive target points of the established measurement trajectory, and to produce a trajectory divergence.

The system also includes a trajectory revision module configured to generate a revised trajectory based on the established measurement trajectory and the trajectory divergence. The controller is also configured to control the measuring probe to continue measuring the work piece according to the revised trajectory.

For example, in some embodiments, the established measurement trajectory includes a plurality of target points, the plurality of target points having a fixed spatial relationship relative to one another; and generating a revised trajectory includes retaining the fixed spatial relationship of the measurements relative to one another. Moreover, in some embodiments, the established measurement trajectory further includes a plurality of moves corresponding to the plurality of target points, each move defining a path, followed by a probe, between consecutive target points.

In some embodiments, generating a revised trajectory includes one or both of (i) shifting a subset of target points of the established measurement trajectory by linearly offsetting the subset of target points in space to match a linear offset of the work piece and/or (ii) shifting a subset of target points of the established measurement trajectory by rotationally offsetting the subset of target points in space to match a rotational offset of the work piece.

In some embodiments, the established measurement trajectory further includes a plurality of moves corresponding to the plurality of target points, each move of the plurality of moves defining a path, followed by the measuring probe, between consecutive target points, the plurality of moves having a fixed spatial relationship relative to one another. In such embodiments, generating a revised trajectory includes retaining the fixed spatial relationship of the moves relative to one another.

Another embodiment is a method of dynamically adapting the operation of a coordinate measuring machine while measuring a work piece. The method includes providing, to the coordinate measuring machine, an established measurement trajectory including a plurality of pre-defined target points, each of the plurality of pre-defined target points having a coordinate location; controlling the coordinate measuring machine to acquire a plurality of initial acquired measurements of the work piece according to an initial set of target points, the initial set of target points being a subset of the plurality of pre-defined target points, the initial set of pre-defined target points defining a remainder of target points; and storing the plurality of initial acquired measurements in a memory.

The method also includes controlling the coordinate measuring machine to acquire the plurality of initial acquired measurements, but—prior to completing execution of the established measurement trajectory—establishing a trajectory divergence based on at least two of the plurality of initial acquired measurements. Based on the trajectory divergence, the method produces a re-oriented set of target points from the remainder of target points, the re-oriented set of target points configured to reduce the trajectory divergence.

Thereafter, the method controls the coordinate measuring machine to continue measuring the work piece according to the re-oriented set of target points, thereby acquiring a remainder of measurements; and stores the remainder of measurements in the memory.

In some embodiments, the pre-defined target points of the established measurement trajectory have a fixed spatial relationship relative to one another; and producing a re-oriented set of target points includes shifting the remainder of target points in space, but retaining the fixed spatial relationship of the remainder of target points relative to one another.

In some embodiments, the established measurement trajectory further includes a plurality of moves corresponding to the plurality of pre-defined target points, each move of the plurality of moves defining a path, followed by a probe of the coordinate measuring machine, between consecutive ones of the pre-defined target points, and producing a re-oriented set of target points includes shifting the remainder of target points in space, but retaining the fixed spatial relationship of the moves relative to one another.

In some embodiments, shifting the remainder of target points in space includes one or both of (i) linearly offsetting each of the remainder of target points in space to match a linear offset of the work piece, and/or (ii) rotationally offsetting the remainder of target points in space to match a rotational offset of the work piece.

Yet another embodiment is a non-transient computer program product bearing non-transient executable computer code which, when executed by a computer processor, control a coordinate measuring machine. The executable computer code includes code for causing a controller to measure a location on the work piece of each of two target points, each of the two target points having a pre-established coordinate location according to an established measurement trajectory, to produce two corresponding location measurements, the two target points defining a remainder of target points of the established measurement trajectory; code for assessing, prior to completing execution of the established measurement trajectory, an orientation of the work piece by processing the two location measurements relative to the pre-established coordinate locations; code for producing a re-oriented set of target points from the remainder of target points of the established measurement trajectory; and code for controlling the coordinate measuring machine to continue measuring the work piece by measuring the work piece according to the re-oriented set of target points.

In some embodiments, the established measurement trajectory includes a plurality of target points, the plurality of target points having a fixed spatial relationship relative to one another; and the code for producing a re-oriented set of target points includes code for shifting the remainder of target points in space, but retaining the fixed spatial relationship of the remainder of target points relative to one another.

In some embodiments, the established measurement trajectory further includes a plurality of moves corresponding to the plurality of target points, each move defining a path, followed by a probe of the coordinate measuring machine, between consecutive target points. In some embodiments, target points, the plurality of moves have a fixed spatial relationship relative to one another, and the code for producing a re-oriented set of target points includes code for shifting the remainder of target points in space, but retaining the fixed spatial relationship of the remainder of target points relative to one another.

In some embodiments, the code for shifting the remainder of target points in space includes code for one or both of (i) offsetting the remainder of target points in space to match a linear offset of the work piece, and/or (ii) offsetting the remainder of target points in space to match a rotational offset of the work piece.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Various embodiments described herein improve the operation of a coordinate measuring machine by revising its measurement trajectory, after beginning but prior to completing its measurement of a work piece, upon detecting misalignment between its original measurement trajectory and the contours of the work piece. The coordinate measuring machine then completes its measurement of the work piece using the revised trajectory. This is an improvement over previous coordinate measuring machine operation because it allows the coordinate measuring machine to complete its measurement of a work piece without having to re-start the measurement process, or develop a new trajectory. Moreover, re-using portions of the pre-established measurement trajectory in a revised trajectory can be beneficial, for example, where the pre-established measurement trajectory has been tailored or optimized for efficiency, or specified to avoid accidental or other undesired contact with the work piece.

Figure 1A:
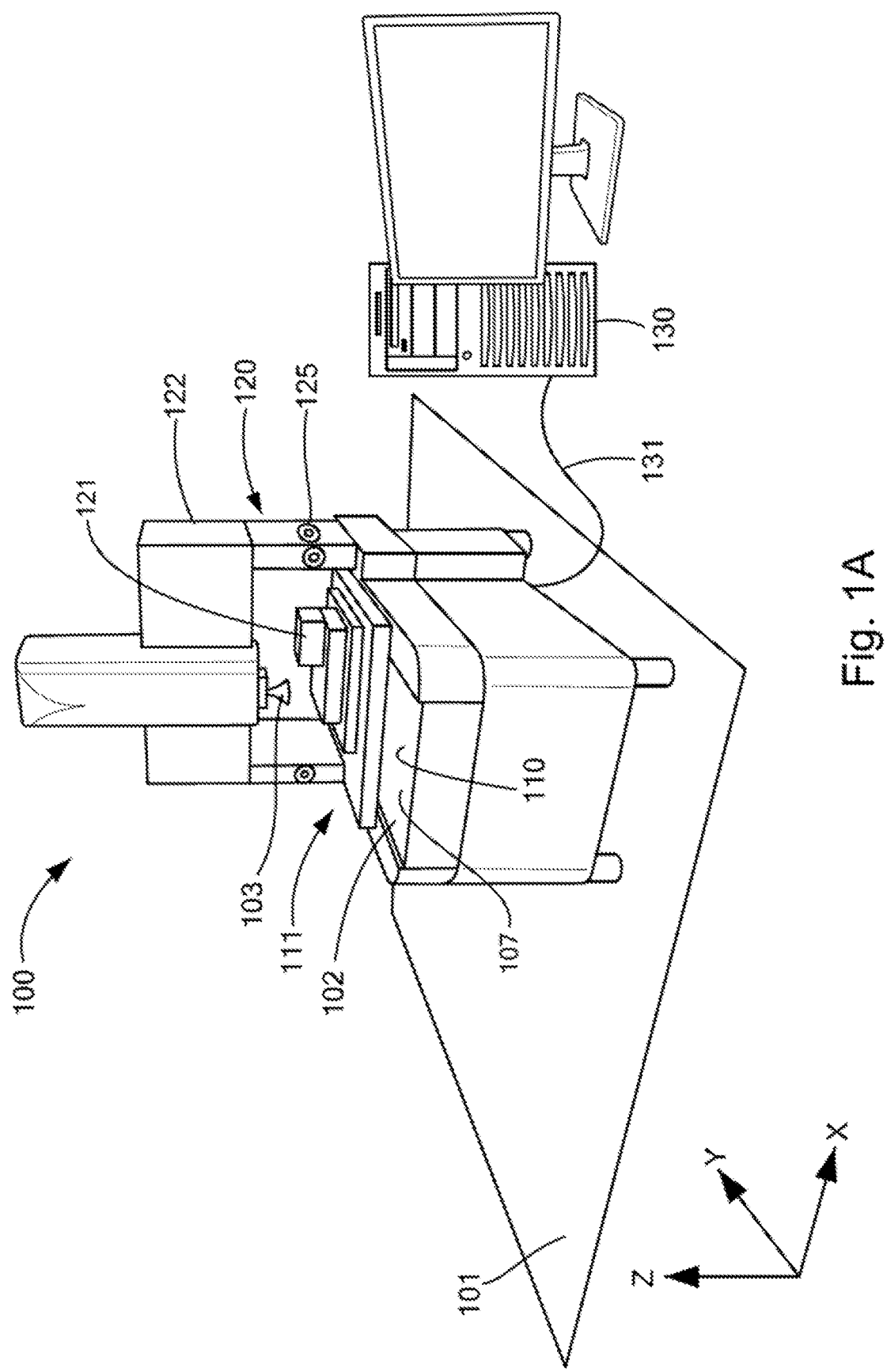
FIG. 1A and FIG. 1B schematically illustrate an embodiment of a CMM.

FIG. 1A shows one type of coordinate measurement machine 100 (hereinafter "CMM 100") that may be configured in accordance with illustrative embodiments. As known by those in the art, the CMM 100, which is supported on a floor 101 in this figure, measures an object or work piece 200 on its bed/table/base (referred to as "base 102"). Generally, the base 102 of the CMM 100 defines an X-Y plane 110 that typically is parallel to the plane of the floor 101, and a measurement volume 111 in the X-Y-Z space above the X-Y plane 110.

Figure 2A:
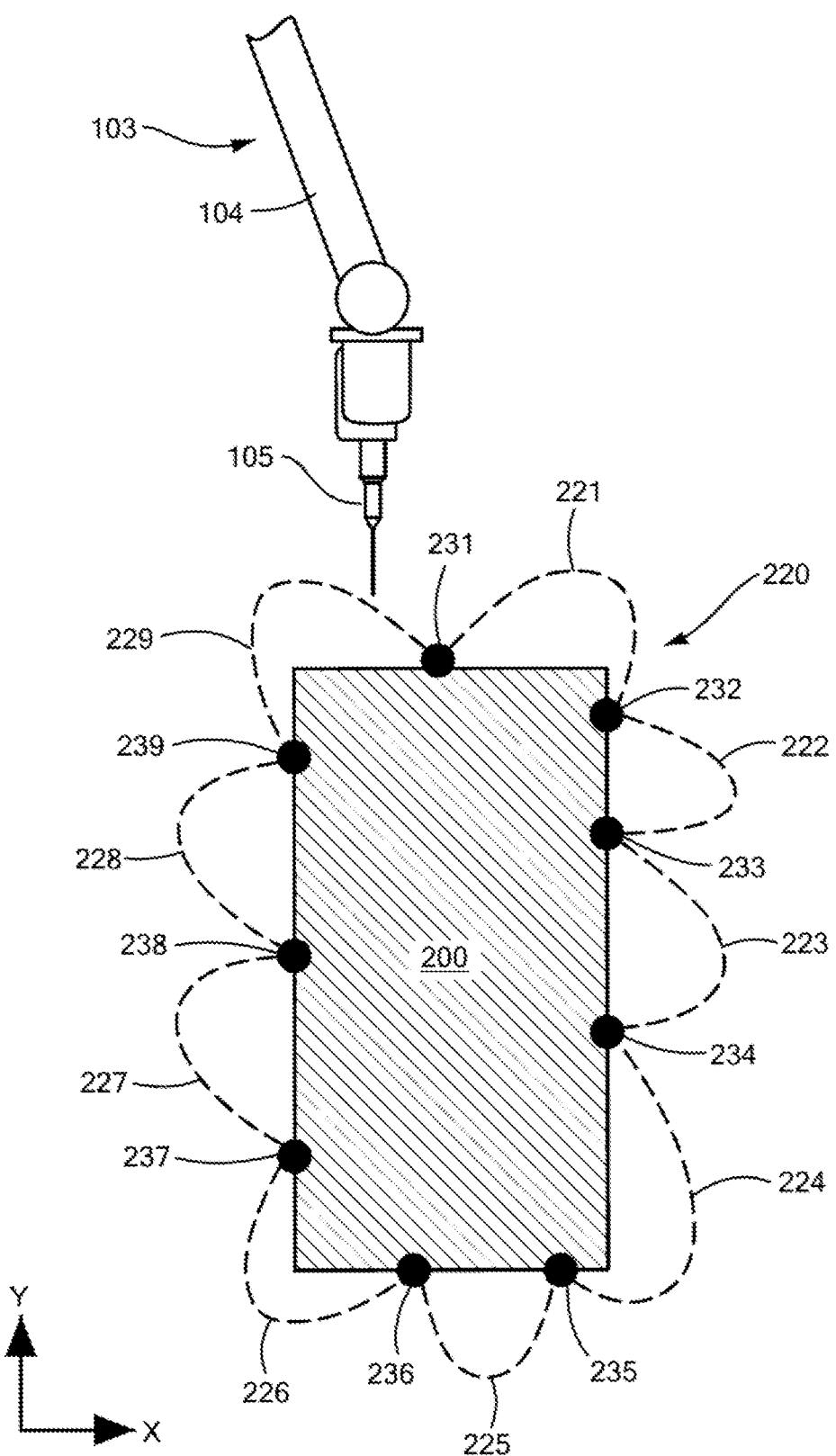
FIG. 2A schematically illustrates a probe measuring a work piece.

To measure an object within a measuring volume 111 on its base 102, the CMM 100 has movable features 122 arranged to move a measuring device 103, such as a probe 105 coupled with a movable arm 104 (FIG. 2A). Alternatively, some embodiments move the base 102 (e.g., or a portion of the base 102, such as a moveable table 107) with respect to a stationary measuring device 103. Either way, the movable features 122 of the CMM 100 manipulate the relative positions of the measuring device 103 and the object with respect to one another to obtain the desired measurement. Accordingly, the CMM 100 can measure the location of a variety of features of the object or artifact.

The CMM 100 has a motion and data control system 120 (or "controller" or "control logic") that controls and coordinates its movements and activities. Among other things, the control system 120 includes a computer processor 121 and the noted sensors/movable features 122. The computer processor 121, which may include a microprocessor, may have on-board digital memory (e.g., RAM or ROM) for storing data and/or computer code, including instructions for implementing some or all of the control system operations and methods. Alternatively, or in addition, the computer processor 121 may be operably coupled to other digital memory, such as RAM or ROM, or a programmable memory circuit for storing such computer code and/or control data.

Alternatively, or in addition, some embodiments couple the CMM 100 with an external computer (or "host computer") 130. In a manner similar to the control system 120, the host computer 130 has a computer processor such as those described above, and computer memory in communication with the processor of the CMM 100. The memory is configured to hold non-transient computer instructions capable of being executed by the processor, and/or to store non-transient data, such as data acquired as a result of the measurements of an object on the base 102.

Among other things, the host computer 130 may be a desktop computer, a tower computer, or a laptop computer, such as those available from Dell Inc., or even a tablet computer, such as the iPad™ available from Apple Inc. The host computer 130 may be coupled to the CMM 100 via a hardwired connection, such as an Ethernet cable 131, or via a wireless link, such as a Bluetooth link or a Wi-Fi link. The host computer 130 may, for example, include software to control the CMM 100 during use or calibration, and/or may include software configured to process data acquired during operation of the CMM 100. In addition, the host computer 130 may include a user interface configured to allow a user to manually operate the CMM 100.

Because their relative positions are determined by the action of the movable features 122, the CMM 100 may be considered as having knowledge of the relative locations of the base 102, and the object or artifact, with respect to its measuring device 103. More particularly, the computer processor 121 and/or computer 130 control and store information about the motions of the movable features 122. Alternatively, or in addition, the movable features 122 of some embodiments include sensors that sense the locations of the table 107 and/or measuring device 103, and report that data to the computers 121 or 130. The information about the motion and positions of the table and/or measuring device 103 of the CMM 100 may be recorded in terms of a one-dimensional (e.g., X; Y; or Z); two-dimensional (e.g., X-Y; X-Z; Y-Z) or three-dimensional (X-Y-Z) coordinate system referenced to a point on the CMM 100.

Figure 1B:
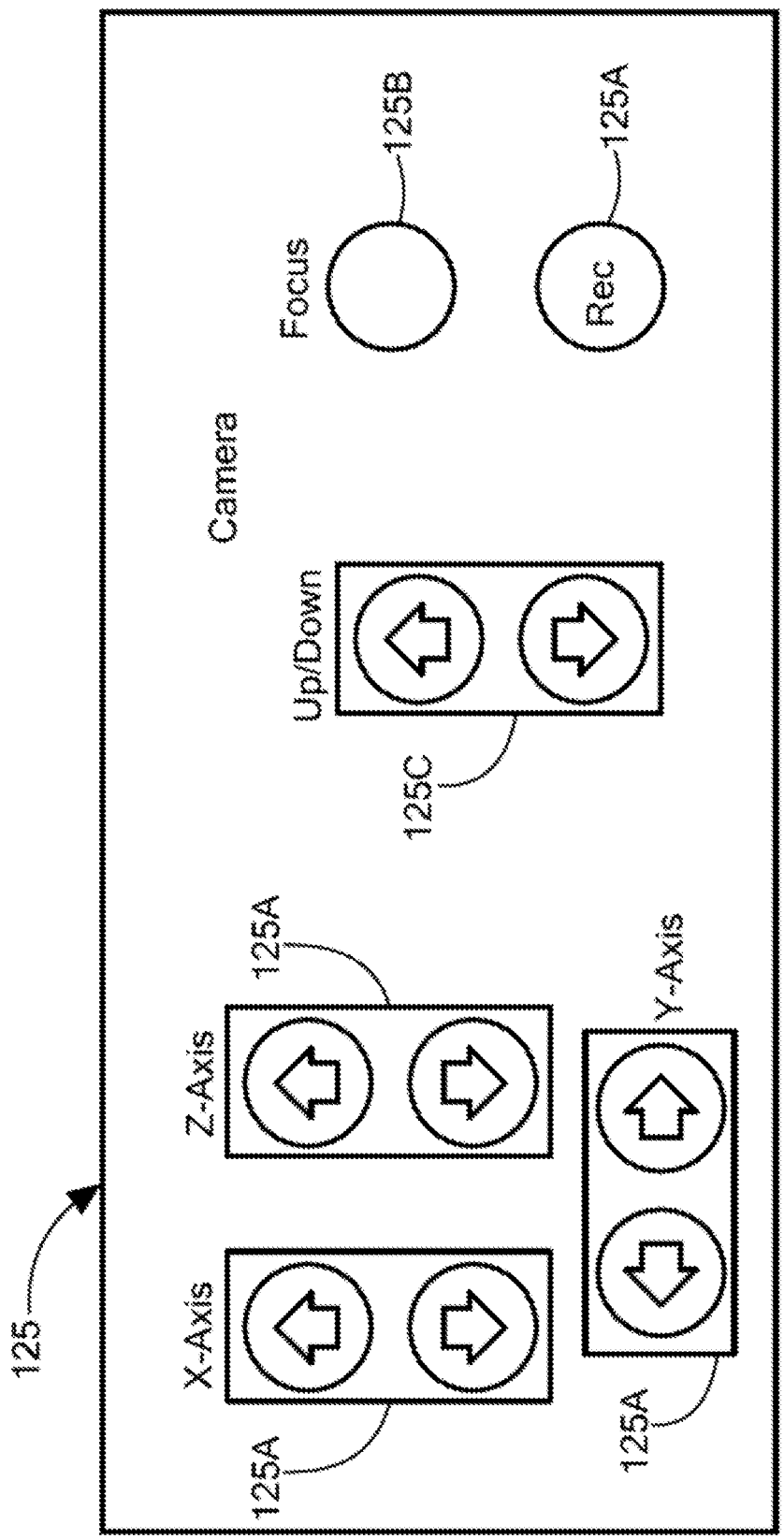

Some CMMs also include a manual user interface 125, such as that shown generically in FIG. 1A and as further schematically illustrated in FIG. 1B. As shown, the manual user interface 125 may have control buttons 125A and knobs 125B that allow a user to manually operate the CMM 100. Among other things, the interface 125 may enable the user to change the position of the measuring device 103 or base 102 (e.g., with respect to one another) and to record data describing the position of the measuring device 103 or base 102.

In a moving table CMM, for example, the measuring device 103 may also be movable via control buttons 125C. As such, the movable features 122 may respond to manual control, or be under control of the computer processor 121, to move the base 102 and/or the measuring device 103 relative to one another. Accordingly, this arrangement permits the object being measured to be presented to the measuring device 103 from a variety of angles, and in a variety of positions.

FIG. 2A schematically illustrates an embodiment of a measuring device 103 measuring a work piece 200. Measurements of the work piece 200 taken by the coordinate measuring machine 100 may be defined, for example, by their location in the X-Y-Z volume of the coordinate measuring machine 100. For ease of explanation, examples herein are described in terms of an X-Y plane, with the understanding that the concepts apply to the X-Z plane, the Y-Z plane, or the X-Y-Z volume.

Pre-Established Trajectory

Illustrative embodiments measure a work piece 200 by sequentially moving the probe 105 to a set of target points 231-239, within the measurement volume 111 of the coordinate measuring machine 100, according to a pre-established trajectory 220. The probe 105 may be a tactile probe, or an optical probe as known in the art of coordinate measuring machines.

As used herein and in any accompanying claims, a "pre-established measurement trajectory" (which may also be referred-to as an "established measurement trajectory" or a "command trajectory") is a predefined set of target points (for example, 231-239) specified in an order in which measurements of a work piece 200 are to be taken. The pre-established measurement trajectory 220 presumes that the work piece 200 is in a known orientation relative to the measurement volume 111. Consequently, the work piece 200 may be considered as having an expected location and orientation relative to the CMM 100, and/or relative to the target points of a pre-established trajectory 220. In other words, the CMM 100 expects the work piece 200 to have an expected location and orientation. The pre-established trajectory 220 may be specific to the work piece 200, in that a CMM would measure another work piece 200 with a different shape with a different pre-established trajectory.

As used herein and in any accompanying claims, a "target point" is a point having a coordinate location, within the measurement volume 111 of a coordinate measuring machine 100, to which the coordinate measuring machine 100 moves a probe 105 for purposes of measuring a corresponding place on a work piece 200. Each of the target points 231-239 of the pre-established trajectory 220 has a pre-defined location (e.g., an X-coordinate, a Y-coordinate, and a Z-coordinate) within the measurement volume 111. In preferred embodiments, the target points 231-239 bear a specified spatial relationship with respect to one another in that the location of each of the specified target points 231-239 bears a fixed spatial relationship relative to each of the other specified points 231-239. In the embodiment of FIG. 2A, for example, each such fixed spatial relationship may be defined between a one of the specified target points (e.g. 231) and another (e.g., 232) as an X-offset distance along the X axis, and a Y offset distance in the Y axis.

In some embodiments, the pre-established trajectory 220 also specifies a plurality of prescribed moves associated with the set of target points (for example, 221-229). As used herein and in any accompanying claims, a "prescribed move" is a path by which coordinate measuring machine 100 moves a measuring probe 105 from one target point in the set of target points (e.g., 231) to another target point (e.g., 232) in the set of points. Each such path may have a specified shape (e.g., a specified arc) configured to move the probe 105 from one point (e.g., 231) to another (e.g., 232) in a method that avoids motion that is unnecessary, and/or that is configured to avoid undesirable contact with a portion of the work piece 200 and/or a portion of the coordinate measuring machine 100. Motion of a probe 105 may be deemed unnecessary if it increases, relative to another possible motion, the time or energy necessary for the probe 105 to move from one target point 231 to the next 232, and/or if the motion does not reduce the likelihood that the probe 105 will incur undesirable contact with a portion of the work piece 200 and/or a portion of the coordinate measuring machine 100. The moves 221-229 may, in some embodiments, bear a specified spatial relationship with respect to one another in that the path of each of the specified moves 221-229 bears a fixed spatial relationship relative to each of the other specified moves 221-229, and/or a fixed spatial relationship relative to each of the specified points 231-239.

In operation, the coordinate measuring machine 100 sequentially moves a probe 105 to each of the target points 231-239, and takes corresponding measurements of the work piece 200, each such measurement associated with a one of the target points 231-239. A target point has been "measured," when the coordinate measuring machine 100 directs a probe 105 to a target point (e.g., 231) and takes a measurement of a work piece 200. Each of the acquired measurements has a location (e.g., an X-coordinate, a Y-coordinate, and a Z-coordinate) within the measurement volume 111. Consequently, a trajectory (e.g., a pre-established trajectory 220, and revised trajectories 270 described below) may be deemed to include the taking of measurements at target points (e.g., 231-239).

Taking a measurement of a work piece 200 at a target point does not necessarily require that the probe 105 actually reach, or be at, the target point 231 because, for example, the probe 105 may encounter the work piece 200 prior to arriving at the target point 231 and measure the coordinate location of place upon encountering the work piece 200, or because the probe 105 may move past the target point 231 prior to encountering, and measuring the coordinate location of, a place on, the work piece 200. For example, if the work piece 200 has an anomaly on its surface, the probe may encounter the work piece 200 prior to reaching a target point (e.g., when the anomaly is a protruding bump on the surface of the work piece and the probe 105 encounters the bump prior to reaching a target point), or may not encounter the work piece until it reaches, or even passes, a target point (e.g., when the anomaly is an unexpected cavity or aperture in the surface of the work piece 200). In other words, unless the work piece 200 is missing, or is far from the location in which the coordinate measuring machine 100 expects to find and measure it, the coordinate measuring machine 100 is able to measure the work piece 200 from each target point 231-239 of a pre-established trajectory 220.

Mis-Oriented Work Piece

Sometimes the work piece 200 is mis-oriented relative to the coordinate measuring machine 100, or relative to its expected location and orientation. For example, sometimes an operator places the work piece 200 on the coordinate measuring machine 100 in an orientation different than an orientation specified or expected for execution of the pre-established trajectory 220.

Mis-Oriented Work Piece—Rotary Displacement Example

Figure 2B:
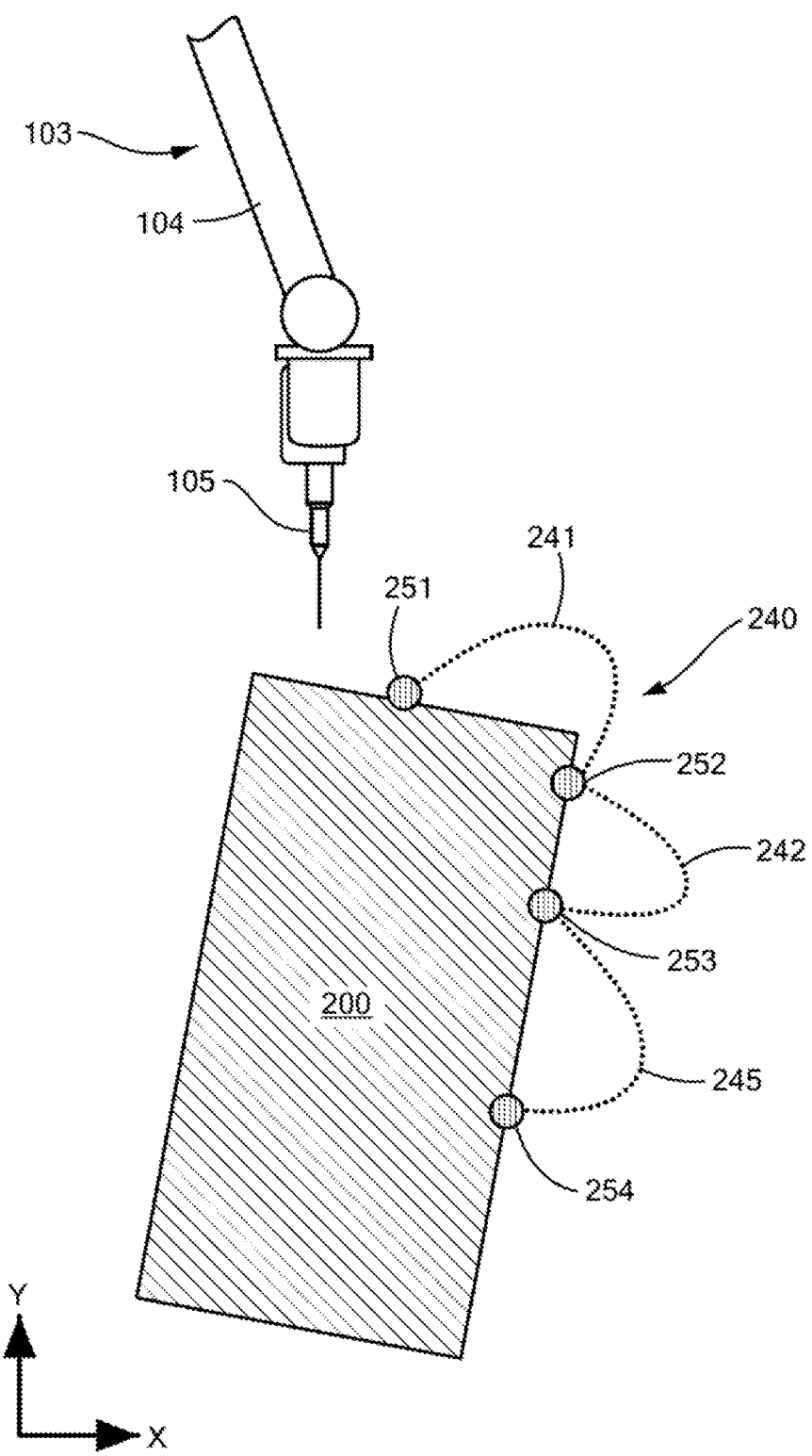
FIG. 2B schematically illustrates a probe measuring a mis-oriented work piece.

For example, FIG. 2B schematically illustrates a mis-oriented work piece 200. For ease of illustration, the work piece 200 in FIG. 2B is illustrated as having pivoted clockwise about point 231 of FIG. 2A, such that point 231 of FIG. 2A is in the same location in the X-Y plane as point 251 of FIG. 2B. However, the described embodiments are not limited to mis-orientations produced by pivoting a work piece about a certain point.

Figure 2C:
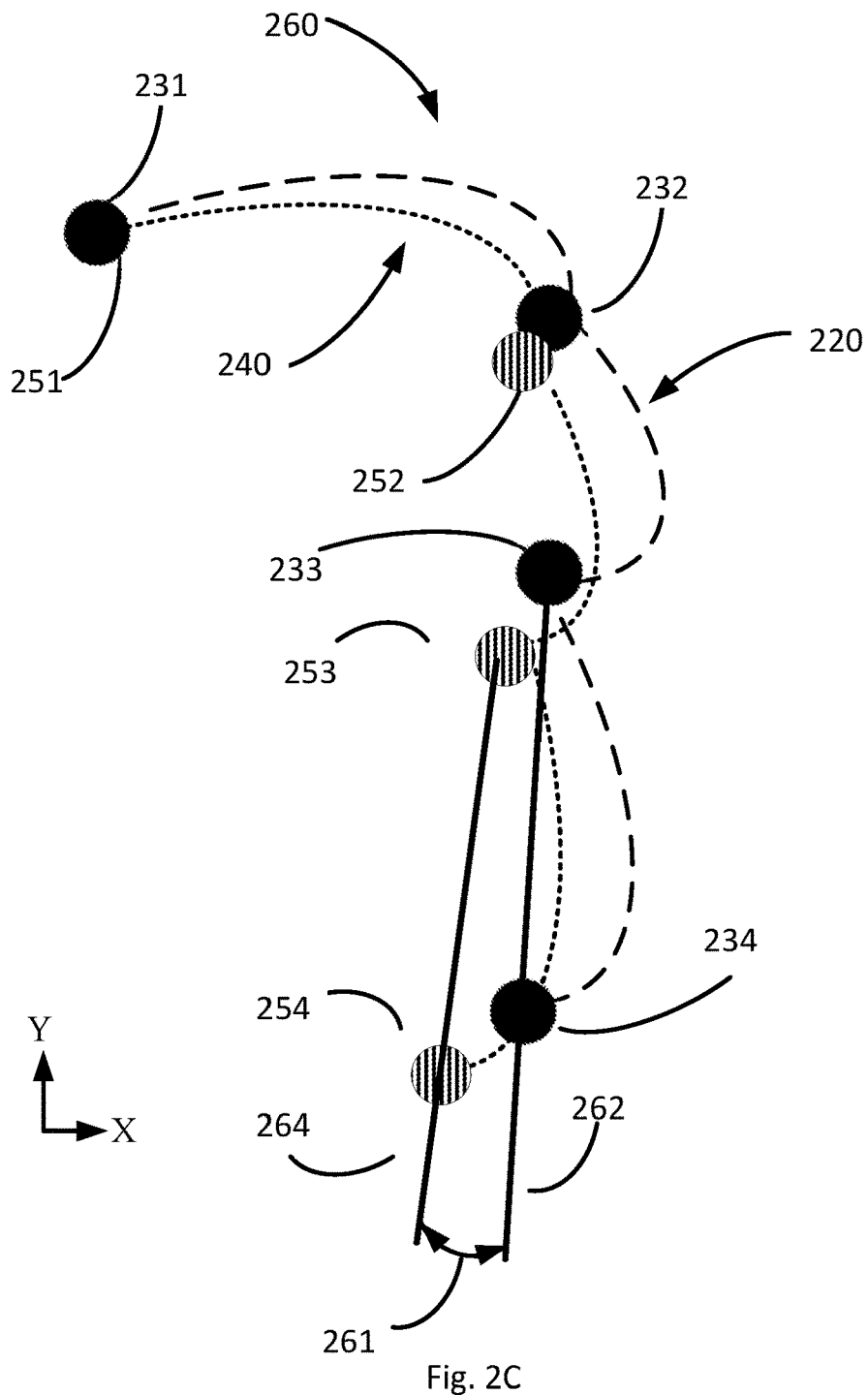
FIG. 2C schematically illustrates a trajectory delta.
Figure 2D:
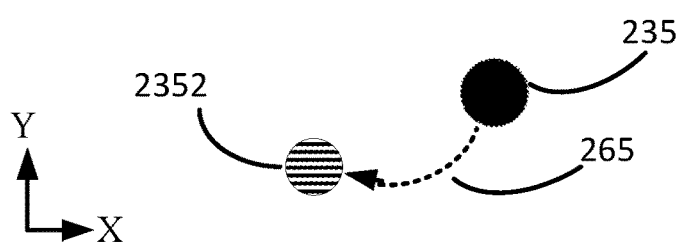
FIG. 2D schematically illustrates a shift of point 235 to a revised location.
Figure 2E:
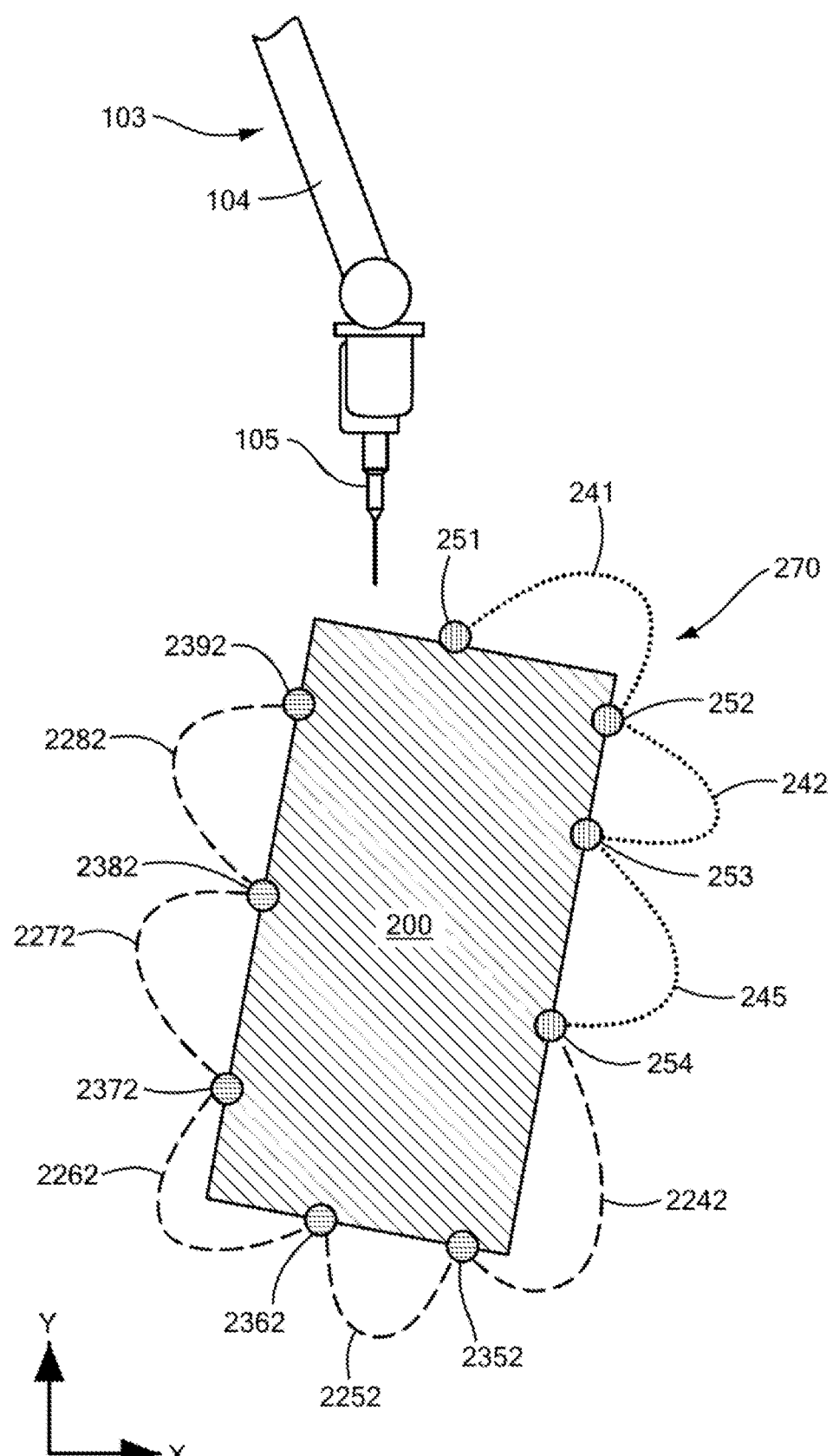
FIG. 2E schematically illustrates a hybrid trajectory.

Some embodiments of the coordinate measuring machine 100 continuously scan a portion of a work piece 200 and produce a continuous measurement of that portion. FIG. 2H schematically illustrates an embodiment of a work piece 200 in a first orientation on a CMM 100, and FIG. 2I schematically illustrates the same work piece in a different, second orientation on the CMM 100. The work piece 200 has a curved portion 201. A continuous scan of the curved portion 201 as oriented in FIG. 2H produces a continuous measurement 2201, as schematically illustrated in FIG. 2J. Continuous measurement 2201 is the expected trajectory for when the work piece 200 is in its expected location, and is the pre-established trajectory (e.g., 220) for a continuous measurement. When the work piece 200 is mis-oriented, as in FIG. 2I for example, the actual measurement is likewise mis-oriented, as shown by the continuous measurement 2401 in FIG. 2K.

Mis-Oriented Work Piece—Lateral Displacement Example

Figure 2F:
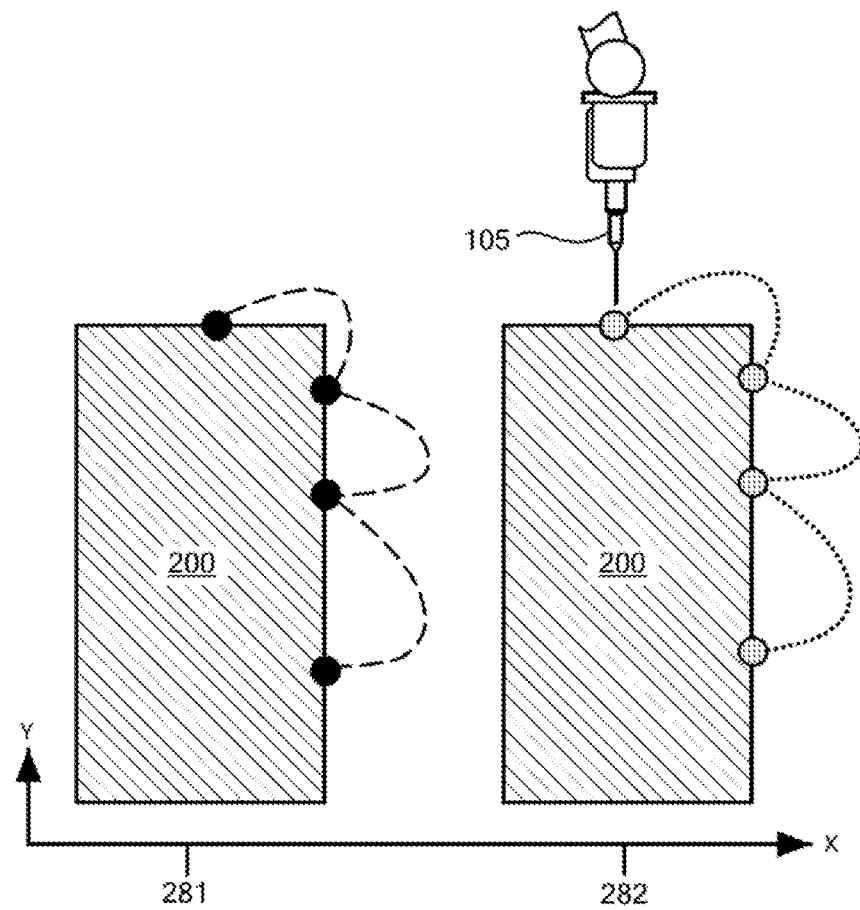
FIG. 2F schematically illustrates a probe measuring a mis-oriented work piece.
Figure 2G:
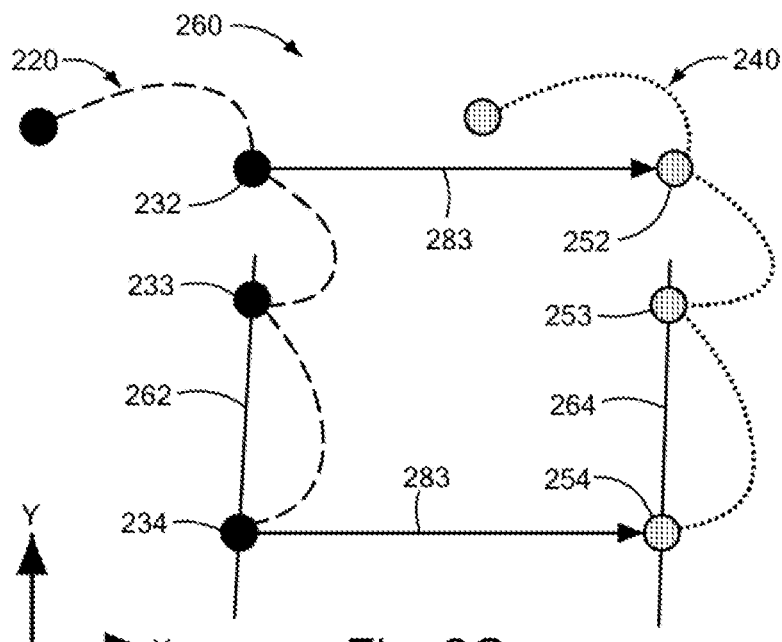
FIG. 2G schematically illustrates a trajectory delta.
Figure 2H:
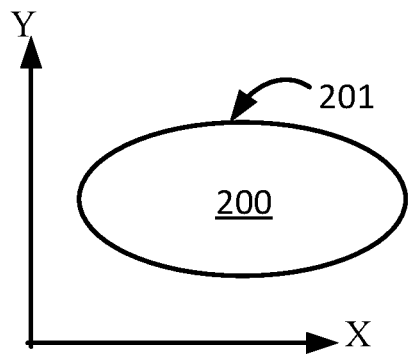
FIGS. 2H-2L schematically illustrate another embodiment of a mis-oriented work piece and a trajectory delta.
Figure 2I:
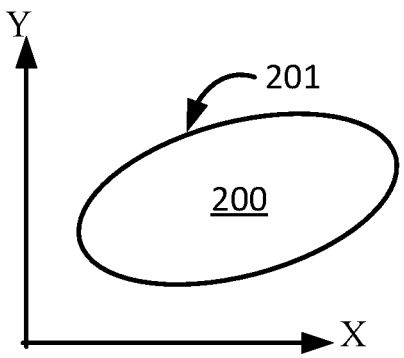
Figure 2J:
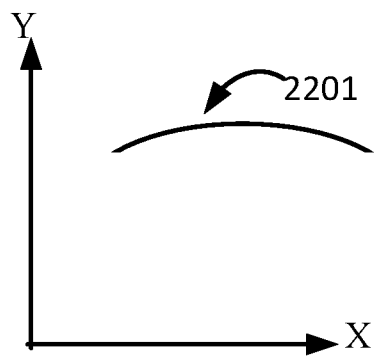
Figure 2K:
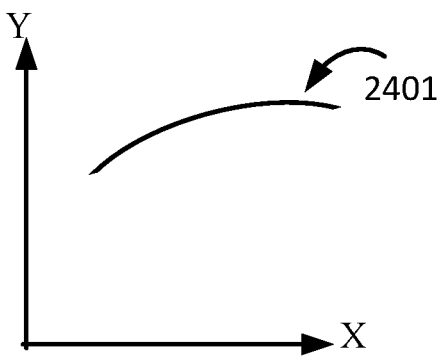

FIG. 2F and FIG. 2G schematically illustrate a work piece 200 that is laterally offset, along the X-axis, from an expected position 281 to an actual position 282. In this simple example, each point on the work piece 200 is laterally offset by a distance 283 (which may also be referred-to as a "linear offset" or "lateral offset"), along the X-axis, from its expected location 281 in the X-Y plane to an offset location 282, and each of the points 252, 253 and 254 actually measured by the probe 105 is laterally offset from its expected location. However, the described embodiments are not limited to mis-orientations produced by pivoting a lateral offset.

Mis-Oriented Work Piece—Compound Offset

Figure 2L:
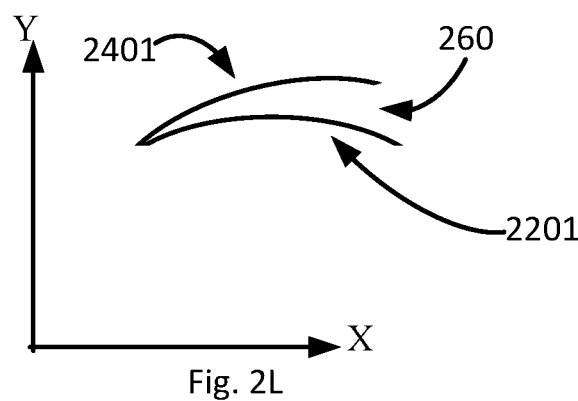
Figure 2M:
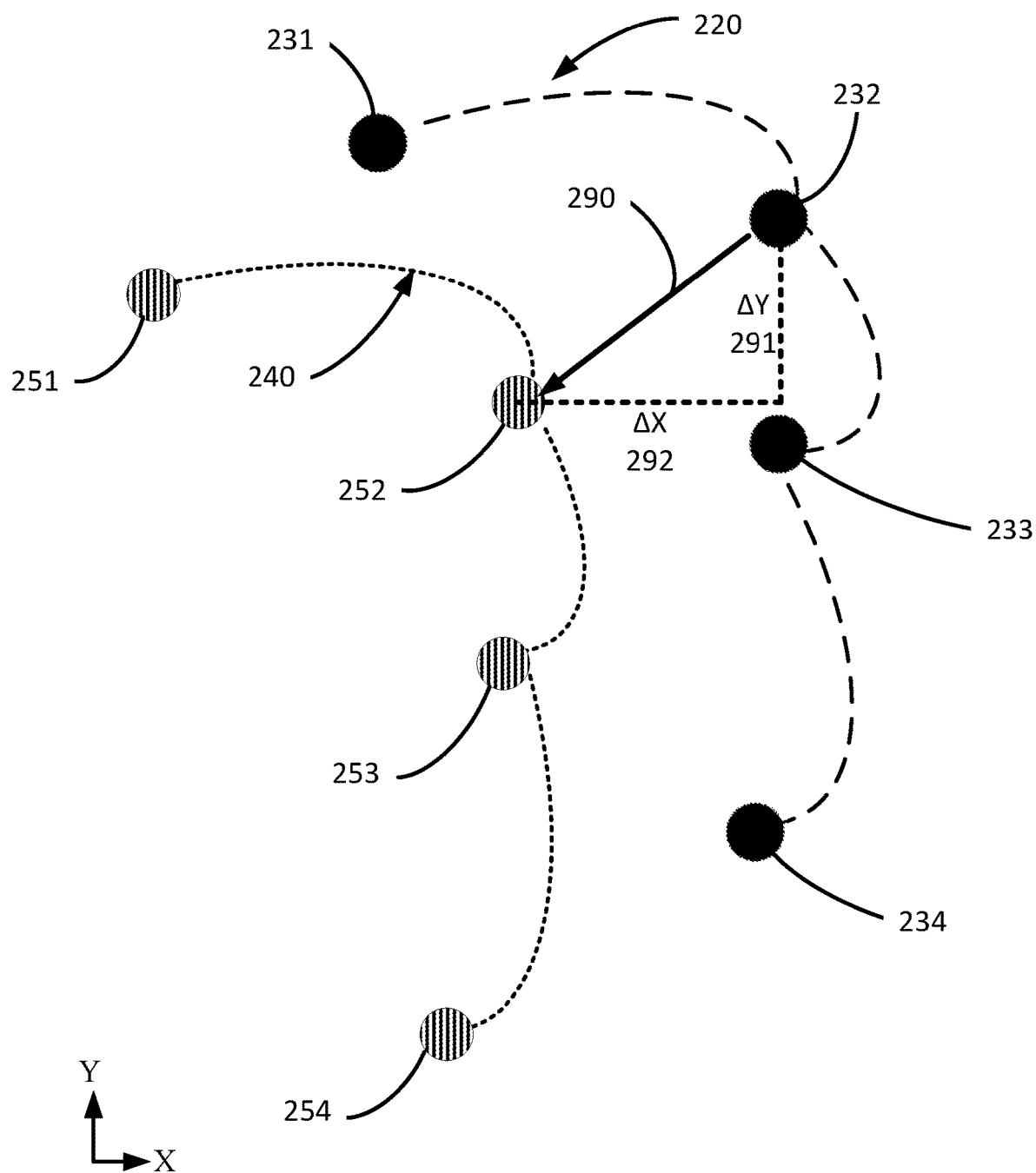
FIG. 2M schematically illustrates a pre-established trajectory and an actual trajectory of a work piece 200 that is both rotationally offset and laterally offset.

FIG. 2M schematically illustrates a pre-established trajectory 220 and an actual trajectory 240 of a work piece 200 that is both rotationally offset and laterally offset. Such an offset may be referred-to as a "compound offset." The pre-established trajectory 220 of FIG. 2M is identical to the pre-established trajectory 220 of FIG. 2C, and the actual trajectory 240 of FIG. 2M is identical to the actual trajectory 240 of FIG. 2C.

Trajectory Divergence

Due to such mis-orientation of the work piece 200, the locations on a work piece 200 actually measured by the coordinate measuring machine are not in the position, in the measurement volume 111, expected by the coordinate measuring machine 100 executing the pre-established trajectory 220. Such mis-orientation causes a trajectory divergence between the pre-established trajectory 220 and the actual trajectory followed by the probe 105. In some cases, execution of a portion of the pre-established trajectory 220 still is able to measure the work piece 200, but in extreme cases some target points of the pre-established trajectory 220 may be so far from the actual location of the work piece as to render the coordinate measuring machine 100 unable to measure the work piece 200.

Divergence—Rotary Displacement Example

For example, in FIG. 2B, each of the points 252, 253 and 254 actually measured by the probe 105 (measurement of which may be referred-to as "actual measurements") is offset from its expected location. Those actual measurements, optionally along with the actual moves 241, 242 and 243, may be referred to as the actual trajectory 240.

A trajectory divergence 260 of the rotationally-offset work piece 200 of FIG. 2B is schematically illustrated in FIG. 2C, which shows that the actual trajectory 240 is rotated, by an angle 261, from the pre-established trajectory 220. The angle 261 in this example is defined as the angle between a first line 262 that passes through two consecutive points of the pre-established trajectory 220 (in this example, point 233 and point 234), and a second line 264 that passes through two corresponding consecutive points of the actual trajectory 240 (in this example, point 253 and point 254).

In the continuous surface measurement example of FIGS. 2H, 2I, 2J, and 2K, the two continuous measurements 2201 and 2401 define a trajectory divergence 260, as schematically illustrated in FIG. 2L. Indeed, the two continuous measurements 2201 and 2401 may be compared to quantify the trajectory divergence 260. The trajectory divergence 260 may be used to produce an adapted trajectory for taking one or more subsequent continuous measurements of the work piece 200 as oriented in FIG. 2I.

Divergence—Lateral Displacement Example

In the case of a lateral offset, such as schematically illustrated in FIG. 2F and FIG. 2G, the first line 262 and the second line 264 are parallel to one another, and according to principles of geometry the slope of the first line 262 is equal to the slope of the second line 264. That the first line 262 is parallel to the second line 264 may be determined by comparing their slopes to one another.

Divergence—Compound Offset

In FIG. 2M, the actual trajectory 240 is rotationally offset from the pre-established trajectory 220 at the same angle 261 as in FIG. 2C. The difference between FIG. 2C and FIG. 2M is that the actual trajectory 240 is also laterally offset from the pre-established trajectory 220.

Such offsets (e.g., a rotary offset, a lateral offset, or a compound offset) can reduce the accuracy of the measurement of the work piece 200 as the coordinate measuring machine 100 moves the probe 105 (for example, according to moves 241, 242, 245), until the probe 105 touches (in the case of a stylus) the work piece 200, and in some cases can make it impossible for the coordinate measuring machine 100 to measure the work piece 200, or complete measurement of a work piece 200 after beginning its measurement of such work piece 200. Moreover, such offsets can reduce the efficiency of the measurement process by increasing the motion of the probe 105, and/or jeopardize the integrity of the measurement process and/or the safety of the probe 105 and/or the safety of the work piece 200, by risking contact between the probe 105 and a portion of the work piece 200 that is in an unexpected position.

The inventors have discovered, however, that measurements of some points (e.g., 251, 252) offset from their expected locations need not be fatal to the complete and successful measurement of the work piece 200. Beneficially, according to various embodiments disclosed herein, successful measurement of the work piece 200 does not require re-orienting the work piece 200; does not require discarding measurements already taken (e.g., 251, 252); and does not require re-initiating the measurement of the work piece 200 from the beginning. Rather, as described herein, such previous measurement (e.g., 251, 252) may be used with subsequent measurements.

Trajectory Revision

Figure 3:
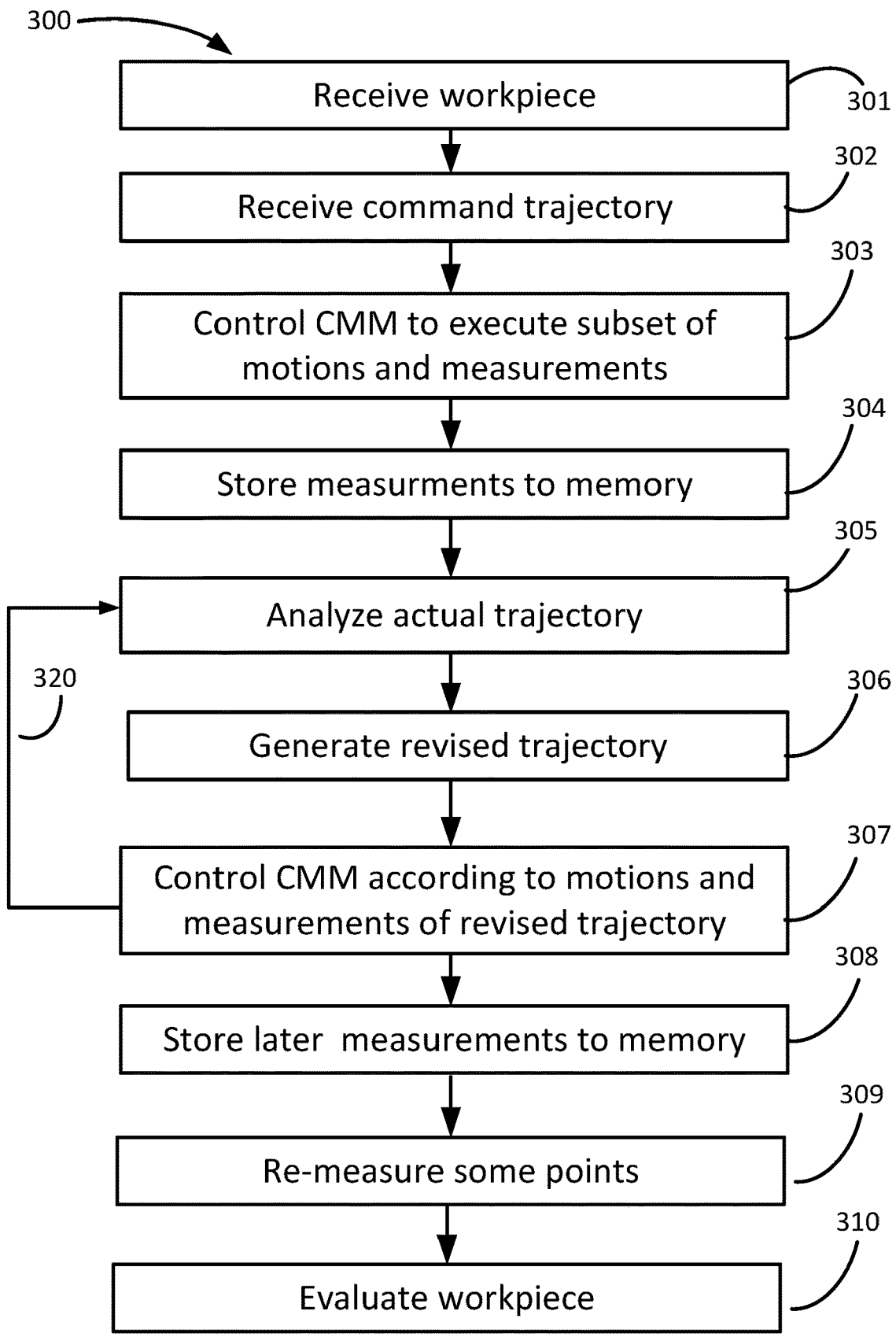
FIG. 3 is a flow chart of a method of dynamically adapting a trajectory.
Figure 4:
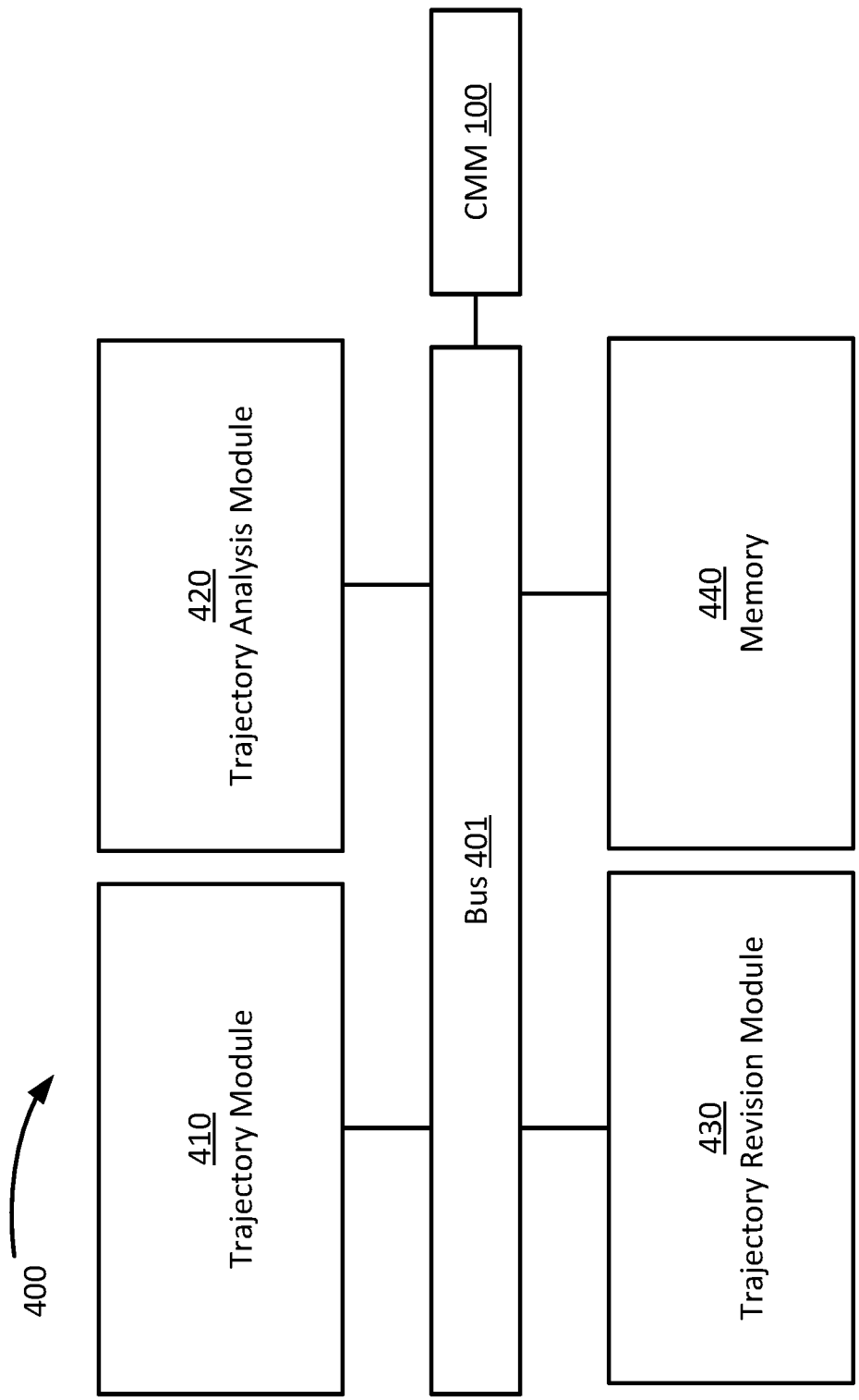
FIG. 4 schematically illustrates a system for dynamically adapting operation of a coordinate measuring machine.

FIG. 3 is a flowchart of a method 300 of measuring a work piece 200 according to various embodiments, and FIG. 4 schematically illustrates a system 400 configured to implement the method 300. The system 400 may be implemented using the components of a coordinate measuring machine 100. In the description below, some or all of the actions attributed to the computer 130 could, in alternate embodiments, be performed instead by the processor 121 in the control system 120.

At step 301, the coordinate measuring machine 100 receives the work piece 200, if such work piece 200 has not previously been provided. For example, an operator may provide the work piece 200 to the coordinate measuring machine 100, by placing the work piece 200 on the table 107 of the coordinate measuring machine 100.

Step 302 provides, to the coordinate measuring machine 100, a pre-established trajectory 220, as described above in various embodiments. Such a pre-established trajectory 220 may be programmed or hardwired into the coordinate measuring machine 100, or may be sent to, or retrieved by, the coordinate measuring machine 100 from a memory 440. For example, as illustrated in FIG. 2A, the pre-established trajectory 220 may include a plurality of measurements to be executed sequentially in a given order, such as a measurement at target point 231, followed by a move 221 to and measurement at target point 232, and so forth for move 222 and measurement at target point 233, and move 223 and measurement at target point 234, etc.

At step 303, the control system 120 controls the coordinate measuring machine 100 to execute a subset of, but not all of, the measurements and motions of the pre-established trajectory 220. In other words, at step 303 the coordinate measuring machine 100 acquires a plurality of measurements of the work piece 200, but fewer than all of the measurements specified by the pre-established trajectory 220.

This execution of a subset of, but not all of, the measurements and motions of the pre-established trajectory 220, divides the pre-established trajectory 220 into two parts—and initial portion and a remainder, as described below.

(1) Initial Portion: The executed subset may be referred-to as the "initial portion" of the pre-established trajectory 220. The plurality of acquired measurements may be referred to as the "initial acquired measurements," according to the pre-established measurement trajectory 220, and the points so measured may be referred to as the "initial set of target points," and the movements made by the coordinate measuring machine in executing those measurements may be referred to as the "initial movements." As used herein and in the accompanying claims, an "initial" set of target points is a subset of, but less than all of, the target points of a pre-established measurement trajectory 220, which subset has been measured by the coordinate measuring machine 100. The measurements taken at step 303 (i.e., the X-Y-Z coordinate data produced by taking each measurement) are stored in memory 440 at step 304.

(2) Remainder. The target points of the pre-established trajectory 220 not yet measured (i.e., the measurements of the pre-established trajectory 220 that are not included within the initial portion) may be referred-to as a remainder of target points (or remaining target points). As used herein and in the accompanying claims, a "remainder" of target points is a subset of target points of an established measurement trajectory. As one example, for a given established measurement trajectory, the "remainder" of target points is that subset of target points of the given established measurement trajectory that remain unmeasured after the coordinate measuring machine has taken measurements at an initial set of target points from the established measurement trajectory.

At step 305, prior to completing execution of the pre-established trajectory 220 (e.g., prior to taking the remainder of measurements) a computer 130 analyzes the actual trajectory 240 to determine the trajectory divergence 260.

In preferred embodiments, analysis of the actual trajectory 240 uses two consecutive measurements from among the initial acquired measurements. More specifically, revising a given trajectory based on two measurements of a work piece 200 is more accurate than revising that given trajectory based on measurement of a single point on the work piece 200. For example, based only on a measurement of a single target point 231 on a work piece 200, the coordinate measuring machine 100 would be unable to distinguish between a mis-oriented work piece 200, and a work piece 200 that has a surface anomaly such as a bump or cavity, and therefore would have no basis on which to revise the remainder target points of an established trajectory to reorient those remainder of target points to accommodate a mis-oriented work piece 200.

Then, at step 306, the computer 130 produces a revised trajectory 270. In preferred embodiments, the computer 130 produces a revised trajectory 270 based on the un-executed moves and measurements of the pre-established trajectory by shifting at least some of the remainder target points (e.g., 235-239) to align them with the actual orientation of the work piece 200. It will be understood that each point of the revised set of target points (e.g., in FIG. 2E, target point 2352-2392) has a coordinate location that is different from the coordinate location of the target points of the target points (e.g., 235-230) of the original pre-established trajectory 220. In preferred embodiments, step 306 also produces a revised set of prescribed moves (2252-2282) associated with the revised set of target points (2352-2392).

Based on actual measurements taken of the work piece, the trajectory is adaptively updated to reduce the trajectory divergence in subsequent measurements of the work piece 200.

Rotational Offset

In the example of the offset work piece 200 of FIG. 2B, the computer rotationally shifts the location of the unexecuted target points 235-239 and moves 224-228 to revised locations, in the X-Y plane. Because the pre-established trajectory 220 and the actual trajectory 240 are offset by angle 261, the rotational shift of each of the unexecuted target points 235-239, in this example, is an arc. The length and geometry of the arc may be determined by the rotational offset of the work piece (e.g., angle 261), and the distance of the unexecuted target point from the axis of rotation (in this example, point 231), according to principles of geometry. As an example, FIG. 2D schematically represents a shift of point 235 from the location illustrated in FIG. 2A to its revised location illustrated in FIG. 2B by the arc 265. The revised trajectory 270 thus includes the shifted target points 2352-2392, which align with orientation the work piece 200, as schematically illustrated in FIG. 2E.

Lateral Offset

Because the pre-established trajectory 220 and the actual trajectory 240 are, in FIG. 2F and FIG. 2G, offset by that distance 283 along the X-axis, the shift of each of the unmeasured target points 235-239 to create a revised trajectory 270, in this example, is a linear shift of distance 283 along the X-axis.

Compound Offset

Because, in FIG. 2M, the actual trajectory 240 is both rotationally offset and laterally offset from the pre-established trajectory 220, the shift of each of the unmeasured target points 235-239 to create a revised trajectory addresses both offsets. For example, such a shift may be determined by a two-stage process. First, define a shift vector 290 as the difference in coordinates between a given one of the target points (e.g. 231 or 232) to a corresponding actual measurement point (e.g., 251 or 252, respectively). For example, in FIG. 2M, the shift vector 290 is defined by a difference in the position of target point 231 and the position of actual measurement point 252 by a difference 291 (ΔY) in the Y axis and by a difference 292 (ΔX) in the X axis. Second, shifting each of the remainder points by the shift vector 290. As an illustrative example, if target point 231 is shifted by vector 290, then target point 231 will correspond to actual measurement point 251. Although the shift vector 290 described above and illustrated in FIG. 2M includes offsets only in the X axis and Y axis, the same principle applies to offsets in the Z axis as well.

Subsequently, the angle 261 may be found, and remainder points may be rotated, as described in connection with FIG. 2C and FIG. 2D. As can be understood from FIG. 2M as described above, shifting the remainder of target points in space includes both linearly offsetting the remainder of target points in space, and rotationally offsetting the remainder of target points in space, to match both a linear offset and a rotational offset of the work piece.

In some embodiments, the target points 2352-2392 of the revised trajectory 270 have (or maintain) the same fixed spatial relationship relative to one another as their counterparts 235-239 in the pre-established trajectory 220. In some embodiments, the unexecuted moves 2242-2282 of the revised trajectory 270 have (or maintain) the fixed spatial relationship relative to as their counterparts 223-228, and the target points 235-239, as have in the pre-established trajectory 220. In other words, in such embodiments, the production of the revised trajectory 270 at step 306 does not change those fixed spatial relationships. This can be beneficial because it re-uses (by re-orienting) portions of the pre-established target points 235-239 and moves 224-228 of the pre-established trajectory 220, without having to discard measurements made before analyzing the actual trajectory 240 (e.g. 251, 252, etc.), and/or re-orient the work piece 200 and re-initiate the measurement of the work piece 200, and/or calculate an entirely new trajectory. Moreover, re-use of the shifted pre-established target points 235-239 and moves 224-228 of the pre-established trajectory gains the benefits thereof, such as efficiency, and/or measurement integrity, and/or the safety of the probe 105, and/or the safety of the work piece, as described above.

Then, at step 307, the computer 130 (and/or the control system 120) controls the coordinate measuring machine 100 to continue its measurement of the work piece 200 by executing the adaptively revised trajectory 270. More specifically, step 307 controls the coordinate measuring machine 100 to continue its measurement of the work piece 200 from the point at which is left off (e.g., from point 254, if that was the last point measured before analysis of the actual trajectory at step 305). The measurements taken at step 307 (i.e., the data produced by taking each measurement) may be referred to as "later measurements" (or "remainder" measurements) and are stored in memory 440 at step 308.

In some embodiments, the method 300 may loop, 320, from step 307 back to step 305 after executing a subset of the revised trajectory. In such embodiments, step 305 assesses the actual trajectory generated by execution of the revised trajectory 270, and step 306 produces a new revised trajectory, and the coordinate measuring machine executes that new revised trajectory at step 307. The method may continue until the coordinate measuring machine 100 completes all moves and measurements of the revised trajectory 270.

In some embodiments, one or more places on the work piece 200 may (optionally) be re-measured at step 309, and the measurements taken at step 309 (i.e., the data produced by taking each re-measurement, which may be referred-to as "re-measurements") are stored in memory 440.

For example, in some embodiments, a pre-established trajectory 220, or revised trajectory 270, may include re-measuring one or more points from the beginning of the pre-established trajectory 220. For example, FIG. 2A schematically illustrates a pre-established trajectory 220 in which point 231 is the first point measured in the pre-established trajectory, and that point 231 is re-measured after move 229. Re-measuring one or more previously-measured points in this way can indicate or assure, if the second measurements are the same at the previous measurements, that the work piece 200 has not moved during the measurement process 300.

At step 310, the method retrieves the measurement data (i.e., the initial measurements, the later measurements, and, if any, the re-measurements) stored in memory 440, and evaluates the work piece by analyzing that retrieved measurement data in ways known in the art. For example, evaluation of the work piece may include comparing the retrieved measurement data to one or more measurement specifications or a computer-aided-design ("CAD") model for the work piece.

As can be understood from the foregoing description, a probe 105 of a coordinate measuring machine 100 is a sensor that monitors aspects of the operation of the coordinate measuring machine 100, and thereby contributes to the operation of the coordinate measuring machine 100. In some embodiments, the method 300 may be described as being open-loop in that it does not include feedback for every move 221-229 or target point 231-239 executed by the coordinate measuring machine 100, meaning that some moves 221-229 and target points 231-239 are made without the benefit of feedback. Because the method 300 revises the trajectory after beginning the measurement process, but prior to completing the measurement process, the operation may be described as dynamically adapting the operation of the coordinate measuring machine 100.

The system 400 of FIG. 4 may be implemented, in whole or in part, on a coordinate measuring machine 100 with a control system 120 and/or a computer 130, as described above. The system 400 includes a trajectory module 410 configured to receive and store pre-established trajectory 220 and one or more revised trajectories 270. The trajectory module 410 is in data communication with the control system 120 and/or computer 130 to provide, to the control system 120 and/or a computer 130, the pre-established trajectory 220 and one or more revised trajectories 270.

The system 400 also includes a trajectory analysis module 420 configured to analyze the actual trajectory 240 at step 305, as described above.

In addition, the system 400 includes a trajectory revision module 430 configured to generate a revised trajectory at step 306, as described above.

The system 400 also includes a memory 440 in data communication with one or more of the trajectory module 410, trajectory analysis module 420, and the trajectory generation module 430. The memory 440 may be part of the control system 120 and/or a computer 130, or may be a separate memory.

The memory 440 may be configured to store computer code configured to execute on a computer processor to implement one or more of the functions of trajectory module 410, trajectory analysis module 420, and the trajectory generation module 430. The memory 440 may also be configured to store measurement data taken of a work piece 200 by the CMM 100.

In the embodiment of FIG. 4, the modules 410, 420, and 430 are coupled in digital communication with one another, and with the coordinate measuring machine 100, via a bus 401. Alternatively, or in addition, some or all of the modules 410, 420, and 430 may be implemented via programming the control system 120 and/or the computer 130.

The following is a list of reference numbers used herein:
100: Coordinate measuring machine;
101: Floor;
102: Base;
103: Measuring device;
104: CMM arm;
105: Probe;
107: Table;
110: X-Y plane;
111: Measurement volume;
120: Control system;
121: Computer processor;
122: Sensors/movable features;
125: CMM user interface;
125A: Control buttons;
125B: Control knobs;
130: Host computer;
131: Cable;
200: Work piece;
220: Pre-established trajectory;
221-228: Moves of pre-established trajectory;
2242-2282: Shifted moves;
231-239: Target points;
2352-2392: Shifted target points;
240: Actual trajectory;
241-249: Moves of actual trajectory;
251-259: Points actually measured;
260: Trajectory delta;
261: Angular offset;
262: Linear characterization of pre-established trajectory;
264: Linear characterization of actual trajectory;
265: Arc shift;
270: Revised trajectory;
281: Presumed position of work piece;
282: Laterally shifted position of work piece;
283: Lateral offset;
290: Shift vector
300: Flow chart of method;
301-310, 320: Method steps;
400: System;
401: System bus;
410: Trajectory module;
420: Trajectory analysis module;
430: Trajectory revision generation module;
440: Memory.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1: A method of dynamically adapting the operation of a coordinate measuring machine while measuring a work piece, the method including:
controlling the coordinate measuring to begin measurement of the work piece;
after beginning measurement of the work piece but prior to completing the measurement of the work piece, assessing the orientation of the work piece and producing, based on the orientation, a revised trajectory for measuring the work piece; and
controlling the coordinate measuring machine to continue measuring the work piece by executing the revised trajectory.

P2: A method according to P1, wherein controlling the coordinate measuring to begin measurement of the work piece includes controlling the coordinate measuring to measure at least two points on the work piece.

P3: A method according to P1 or P2, wherein controlling the coordinate measuring to begin measurement of the work piece includes controlling the coordinate measuring according to a pre-established measurement trajectory.

P10: A method of operating a coordinate measuring machine while measuring a work piece, the method including executing a subset of a plurality of moves and measurements of a pre-established trajectory to generate an actual trajectory;
evaluating the actual trajectory relative to the pre-established trajectory to determine a trajectory divergence;
preparing a revised trajectory (which may also be referred to as a "prime trajectory) including a revised plurality of moves and measurements configured to reduce a subsequent trajectory divergence; and
controlling the coordinate measuring machine to execute moves and motions of the revised trajectory.

P11. The method of P10, further including, prior to executing a subset of the plurality of moves and measurements, receiving a work piece to be measured at the coordinate measuring machine.

P12. The method of P10, further including, prior to executing the subset of the plurality of moves and measurements of the pre-established trajectory, retrieving, from a computer memory, the pre-established trajectory, the pre-established trajectory including a sequence of moves and measurements to be executed by the coordinate measuring machine to measure the work piece.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A system for measuring a work piece, the system comprising:
    a trajectory module configured to store an established measurement trajectory;
    a controller in data communication with the trajectory module to receive, from the trajectory module, the established measurement trajectory, and configured to control a measuring probe according to a subset of, but less than all of, the established measurement trajectory;
    a trajectory analysis module configured to analyze an actual trajectory executed by the measuring probe, relative to the established measurement trajectory, based on measurements of the work piece taken according to at least two consecutive target points of the established measurement trajectory, and to produce a trajectory divergence; and
    a trajectory revision module configured to generate a revised trajectory based on the established measurement trajectory and the trajectory divergence,
    the controller configured to control the measuring probe to measure the work piece according to the revised trajectory.

2. The system of claim 1, wherein:
    the established measurement trajectory includes a plurality of target points, the plurality of target points having a fixed spatial relationship relative to one another; and
    generating a revised trajectory includes retaining the fixed spatial relationship of the measurements relative to one another.

3. The system of claim 2, wherein:
    the established measurement trajectory further includes a plurality of moves corresponding to the plurality of target points, each move defining a path, followed by the measuring probe, between consecutive target points.

4. The system of claim 2, wherein:
the established measurement trajectory further comprises a plurality of moves corresponding to the plurality of target points, each move defining a path, followed by the measuring probe, between consecutive target points, the plurality of moves having a fixed spatial relationship relative to one another; and
generating a revised trajectory includes retaining the fixed spatial relationship of the moves relative to one another.

5. The system of claim 1, wherein generating a revised trajectory includes shifting a subset of target points of the established measurement trajectory by linearly offsetting the subset of target points in space to match a linear offset of the work piece.

6. The system of claim 1, wherein generating a revised trajectory includes shifting a subset of target points of the established measurement trajectory by rotationally offsetting the subset of target points in space to match a rotational offset of the work piece.

7. The system of claim 1, wherein generating a revised trajectory includes both:
linearly offsetting each point of a subset of target points, and
rotationally offsetting each point of the subset of target points,
to match both a linear offset and a rotational offset of the work piece.

8. A method of dynamically adapting the operation of a coordinate measuring machine while measuring a work piece, the method including:
providing, to the coordinate measuring machine, an established measurement trajectory comprising a plurality of pre-defined target points, each of the plurality of pre-defined target points having a coordinate location;
controlling the coordinate measuring machine to acquire a plurality of initial acquired measurements of the work piece according to an initial set of target points, the initial set of target points being a subset of the plurality of pre-defined target points, the initial set of pre-defined target points defining a remainder of target points;
storing the plurality of initial acquired measurements in a memory;
after controlling the coordinate measuring machine to acquire the plurality of initial acquired measurements, but prior to completing execution of the established measurement trajectory, establishing a trajectory divergence based on at least two of the plurality of initial acquired measurements;
based on the trajectory divergence, producing a re-oriented set of target points from the remainder of target points, the re-oriented set of target points configured to reduce the trajectory divergence;
controlling the coordinate measuring machine to continue measuring the work piece according to the re-oriented set of target points, thereby acquiring a remainder of measurements; and
storing the remainder of measurements in the memory.

9. The method of claim 8, wherein:
the pre-defined target points of the established measurement trajectory have a fixed spatial relationship relative to one another; and
producing a re-oriented set of target points comprises shifting the remainder of target points in space, but retaining the fixed spatial relationship of the remainder of target points relative to one another.

10. The method of claim 9, wherein:
the established measurement trajectory further includes a plurality of moves corresponding to the plurality of pre-defined target points, each move of the plurality of moves defining a path, followed by a probe of the coordinate measuring machine, between consecutive ones of the pre-defined target points.

11. The method of claim 9, wherein:
the established measurement trajectory further comprises a plurality of moves corresponding to the plurality of pre-defined target points, each move defining a path, followed by a probe of the coordinate measuring machine, between consecutive ones of the pre-defined target points, the plurality of moves having a fixed spatial relationship relative to one another; and
producing a re-oriented set of target points comprises shifting the remainder of target points in space, but retaining the fixed spatial relationship of the moves relative to one another.

12. The method of claim 9, wherein shifting the remainder of target points in space comprises linearly offsetting each of the remainder of target points in space to match a linear offset of the work piece.

13. The method of claim 9, wherein shifting the remainder of target points in space comprises rotationally offsetting the remainder of target points in space to match a rotational offset of the work piece.

14. The method of claim 9, wherein shifting the remainder of target points in space comprises both:
linearly offsetting the remainder of target points in space, and
rotationally offsetting the remainder of target points in space,
to match both a linear offset and a rotational offset of the work piece.

15. A non-transient computer program product bearing non-transient executable computer code which, when executed by a computer processor, control a coordinate measuring machine, the executable computer code comprising:
code for causing a controller to measure a work piece according to each of two target points of an established measurement trajectory, each of the two target points having a pre-established coordinate location according to the established measurement trajectory, to produce two corresponding location measurements, the two target points defining a remainder of target points of the established measurement trajectory;
code for assessing, prior to completing execution of the established measurement trajectory, an orientation of the work piece by processing the two location measurements relative to the pre-established coordinate locations
code for producing a re-oriented set of target points from the remainder of target points of the established measurement trajectory; and
code for controlling the coordinate measuring machine to continue measuring the work piece by measuring the work piece according to the re-oriented set of target points.

16. The non-transient computer program product of claim 15, wherein:
the established measurement trajectory includes a plurality of target points, the plurality of target points having a fixed spatial relationship relative to one another; and
code for producing a re-oriented set of target points comprises code for shifting the remainder of target points in space, but retaining the fixed spatial relationship of the remainder of target points relative to one another.

17. The non-transient computer program product of claim 16, wherein:
the established measurement trajectory further includes a plurality of moves corresponding to the plurality of target points, each move defining a path, followed by a probe of the coordinate measuring machine, between consecutive target points.

18. The non-transient computer program product of claim 16, wherein:
the established measurement trajectory further comprises a plurality of moves corresponding to the plurality of target points, each move defining a path, followed by a probe of the coordinate measuring machine, between consecutive target points, the plurality of moves having a fixed spatial relationship relative to one another; and
code for producing a re-oriented set of target points comprises code for shifting the remainder of target points in space, but retaining the fixed spatial relationship of the remainder of target points relative to one another.

19. The non-transient computer program product of claim 18, wherein code for shifting the remainder of target points in space comprises code for linearly offsetting the remainder of target points in space to match a linear offset of the work piece.

20. The non-transient computer program product of claim 18, wherein code for shifting the remainder of target points in space comprises code for rotationally offsetting the remainder of target points in space to match a rotational offset of the work piece.

* * * * *